Figure 1:
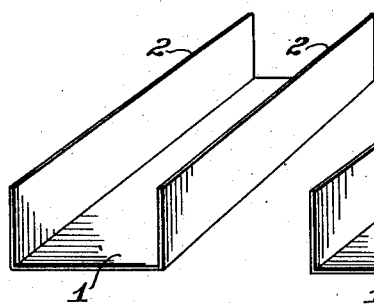

Oct. 8, 1940.                V. M. GOLDSCHMIDT                 2,216,813
                            METAL CASED REFRACTORY
                   Filed Aug. 25, 1938            2 Sheets-Sheet 1

INVENTOR.
Victor M. Goldschmidt
BY
Brown, Critchlow & Flick
his ATTORNEYS.

WITNESSES
AB Wallace
Fulton B. Flick

Oct. 8, 1940.　　V. M. GOLDSCHMIDT　　2,216,813
METAL CASED REFRACTORY
Filed Aug. 25, 1938　　2 Sheets-Sheet 2

INVENTOR.
Victor M. Goldschmidt
BY
Brown, Critchlow & Flick
His ATTORNEYS.

WITNESSES
AB Wallace

Patented Oct. 8, 1940

2,216,813

UNITED STATES PATENT OFFICE 2,216,813

METAL CASED REFRACTORY

Victor Moritz Goldschmidt, Holmenkollen, per Oslo, Norway

Application August 25, 1938, Serial No. 226,725
In Austria August 30, 1937

7 Claims. (Cl. 72—37)

This invention relates to metal cased refractory articles such as brick and other shapes used in the construction of furnaces and the like structures exposed to high temperatures.

Metal cased refractory articles have been used heretofore in the construction of furnaces such, for instance, as those used in metallurgical operations. For example, they have been used in exposed walls and suspended roofs of copper reverberatory and refining furnaces, in exposed walls of open hearth and electric steel furnaces, and in other built-up furnace structures such as back and front walls, and in the ends, bulkheads, division walls, uptakes and bridge walls, as well as for other furnace elements where brick must ordinarily be renewed frequently.

Such refractory shapes are made either by ramming a refractory batch into a tube of cylindrical or non-cylindrical cross-section, or by applying various forms of sheet metal sheaths or mantles to preformed refractory shapes. Up to the time of this invention only non-acidic refractories have been used in the manufacture of such shapes because the metal casing, commonly iron or steel, undergoes oxidation in the use of the furnace and the oxide formed is basic so that it readily slags silica, silicates and related acidic materials at rather low temperatures with consequent impairment or destruction of the article. Consequently, users of metal cased bricks and other shapes have been restricted to non-acidic refractories, such as chrome ore and magnesite, which necessarily has somewhat restricted the fields of applicability of metal cased shapes.

It is among the objects of this invention to provide metal cased refractory articles of the type used heretofore but in which the refractory is made from or contains large amounts of silicate, and which not only embody the advantages of prior types of such articles but also are not subject to slagging caused by the metallic casing.

A special object of the invention is to provide metal cased silicate refractory articles in which volume changes encountered in heating are minimized as compared with prior practice in this art.

A further object is to permit the production of refractories of this class which embody the foregoing advantages and which may be made from unconsolidated batches or preformed shapes, especially chemically bonded, formed shapes.

Other objects of the invention will be understood from the following description.

The invention will be described with reference to the accompanying drawings which show some of the forms of casings that may be used in its practice.

The invention is predicated upon my discovery that, apparently uniquely among the silicates, magnesium orthosilicate and materials rich in magnesium orthosilicate may be used as refractory in metal cased structures, particularly with ferrous metal, without encountering the seriously objectionable slagging that has heretofore prevented the successful use of silica and silicates in metal cased refractory articles. Not only is magnesium orthosilicate resistant to fluxing by the metal of the casing and its oxide, but also in many cases the fused metal, such as iron, or its oxide flow over the surface of the refractory without penetrating into it.

A particular advantage of the metal cased refractories provided by the invention is that they are substantially volume constant when subjected to heating, as in a furnace structure. The absence of volume changes of any substantial size resulting from the use of forsterite, or magnesium orthosilicate, thus avoids harmful loosening of the refractory mass in its metallic sheathing so that a disadvantage sometimes encountered in prior metal cased refractory shapes is avoided.

Magnesium orthosilicate is in itself highly refractory so that such materials supply an essential requirement for furnace construction. In addition, the ability to use this silicate in the production of metal cased refractory articles extends the fields of use of metal cased refractories beyond those heretofore practicable because of prior restriction to basic or neutral refractories.

In the practice of the invention there may be used pure, or substantially pure, magnesium orthosilicate such, for example, as magnesium orthosilicate produced artificially, as by the heat treatment of hydrous magnesium silicates mixed with sufficient magnesia to produce the orthosilicate. For most purposes, however, it is advantageous to use natural products consisting largely of or rich in magnesium orthosilicate, or forsterite, examples being the olivine rocks, particularly the dunites. Although iron oxide produced in oxidation of ferrous metal sheaths does not cause slagging of these magnesium orthosilicate materials, it may be desirable for some purposes to use olivine rocks of relatively low iron content.

The refractory may consist of magnesium orthosilicate or materials rich in it, such as olivine rocks, or, if desired, the magnesium orthosilicate material may be mixed with other refractory materials such as chrome ore, burned magnesite, burned dolomite, and the like non-acidic refractories. The magnesites may, for example, be of high purity or high in lime, such as those shown in the following table, the compositions being those of dead burned materials:

|  | Magnesite | |
| --- | --- | --- |
|  | A | B |
|  | *Percent* | *Percent* |
| MgO | 80.8 | 57.6 |
| CaO | 5.8 | 25.0 |
| SiO$_2$ | 6.7 | 7.8 |
| R$_2$O$_3$ | 6.5 | 9.1 |
| Ignition loss | 0.2 | 0.5 |

My tests have shown also that non-acidic metallic oxides may be admixed with the magnesium orthosilicate material, even in relatively large amounts. As an example, additions of as much as 10 per cent or more by weight of iron oxide do not tend to destroy or to detrimentally affect the refractoriness of magnesium orthosilicate refractories in accordance with this invention. To the contrary, such additions commonly tend to effect better bonding of the magnesium orthosilicate material.

The refractory articles provided by the invention may be made from the magnesium orthosilicate material in a wide variety of ways. For example, the refractory body may be made by preforming the shape or by placing the unburned refractory or refractory batch into the metallic case. In the use of preformed refractory the shape may be pressed or otherwise formed and then associated with the metallic case either before or after firing. Thus, there may be used fired shapes or shapes bonded chemically which become fired under heat applied to the furnace structure built from the metal cased chemically bonded shapes. Or, massive magnesium orthosilicate material may be cut into shapes for direct association with the case; this mode of preforming the shape may be applied, for example, to olivine rock. Another procedure is to pack the refractory or refractory batch into the metallic casing, as by tamping, jolting, or pressing it into the casing.

Where granulated refractory or a refractory batch is used the material may be crushed in accordance with existing practice in the refractory art, although for most purposes the most satisfactory results are attained through the use of granules graded to provide as dense packing as possible. Likewise to provide the refractory body in dense form it is desirable to press the shape, or to pack the batch into the casing, under high pressure. The batches may be varied according to circumstances and existing practice, but where magnesium orthosilicate material, such as olivine rock, is mixed with a non-acidic refractory, such as magnesite or chromite, it is preferred to have the olivine in granular to coarsely granular form, and the magnesite or chromite in finely divided form.

Unfired preformed shapes may be made from magnesium orthosilicate and batches containing it by the use of chemical bonding agents of various types of which a variety are known in the art, examples being caustic magnesite, magnesium chloride, boric acid, water glass solutions, lignin liquor, dextrine and other carbohydrates, rubber solutions, powdered metals, for example iron, and others.

From what has been said it will be understood that the invention resides in a composite refractory article comprising a refractory body portion of magnesium orthosilicate material and a metallic casing which covers at least a portion, such as a major face, of the refractory body. In the case of shapes of rectangular section the sheath or mantle may cover two but most suitably covers three faces of the body. In all instances all of the faces may be covered with metal, and one or both ends may be enclosed also if desired for any reason.

For most purposes ferrous metal, i.e., iron or steel, is preferred as the casing metal, and in general the case may be rather thin. The exact thickness used will depend in part upon the size and weight of the shape, and upon the manner of making it, i. e., where the batch is pressed into the sheath the latter may need to be heavier than where it is merely applied to a preformed shape. For many purposes cases of sheet metal may be made from iron or steel sheet about 0.5 to 2 mm. thick, while tubular casings may have a wall thickness from about 1 to 4 mm. These dimensions are, of course, by way of illustration, and are not limiting.

The composite refractory articles provided by the invention are laid up into the furnace structures in accordance with the practice well known and understood in the art.

The metallic case may take various forms although, as indicated hereinabove, in every embodiment the case covers at least a portion of the refractory body. Most suitably the case is so constructed and sized that when the articles are built up into a furnace structure the portion of each article which is subject to the heat of the furnace and is adjacent to another such article is completely or effectively sheathed by metal, to minimize spalling and to permit attainment of the other advantages of metal cased refractories.

Figure 3:
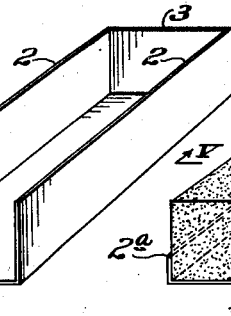
Figure 2:
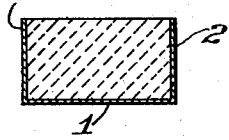

The invention may be described further with reference to the accompanying drawings. Fig. 1 shows a sheet metal casing adapted for use with ordinary rectangular refractory brick, or straights. It comprises a portion 1 adapted to cover one of the major faces of the brick, and side portions 2 which completely cover the sides of the brick, as may be seen from Fig. 2, a cross-section through a composite structure in accordance with the invention made from the sheath of Fig. 1. This member is open at both ends, but if desired the casing may be closed at one or both ends. A sheath similar to that shown in Fig. 1 but closed at one end 3 is shown in Fig. 3.

Figure 4:
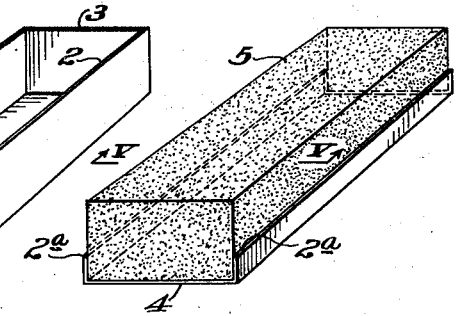
Figure 5:
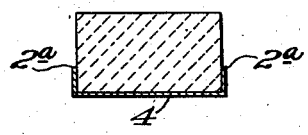

Another form of sheath, or casing, 4 is shown in Fig. 4 associated with a magnesium orthosilicate brick 5 in accordance with the invention. This sheath differs from the form shown in Fig. 1 essentially in that the side portions 2a extend only partway over the sides of brick 5, as shown in the cross-sectional view, Fig. 5.

Figure 6:
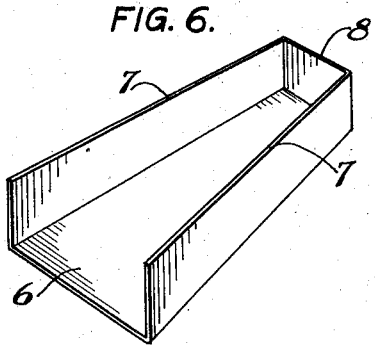

The invention is not restricted to the production of rectangular bricks, or straights, but is applicable to all of the various shapes used in furnace construction and in other structures embodying refractories. Fig. 6 shows a sheath adapted for use with wedge brick and comprising a portion 6 adapted to completely cover one of the main faces of the brick, and side walls 7 which may completely cover the sides of the brick, as in Figs. 1 and 3, or extend only partway over them as in Fig. 4. If desired this sheath may be closed at one end, 8.

The foregoing embodiments are applicable to the production of articles from preformed shapes, such as those pressed from batches or cut from magnesium orthosilicate blocks. Likewise, they may be placed in the mold box of a press and the batch pressed directly in the casing.

Figure 7:
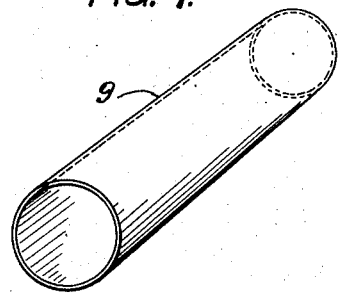
Figure 8:
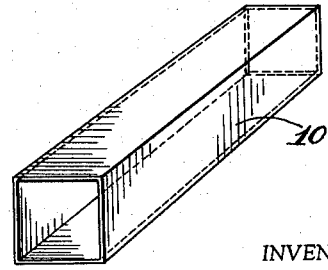

Fig. 7 illustrates a cylindrical casing 9, such as an iron tube. Other sections than circular may be used, a square section tube 10 being shown in Fig. 8. The casings shown in Figs. 7 and 8 may be open at both ends, or closed at one end, as desired, and, generally speaking, in these embodiments of the invention the refractory is fired after the furnace structure has been built. Such casings are particularly adapted to receive refractory or refractory batch which is fired after the structure has been built from them.

Figure 9:
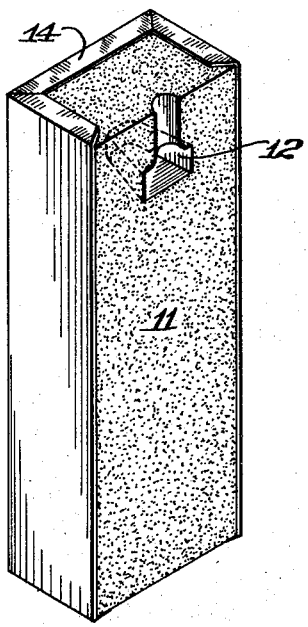
Figure 10:
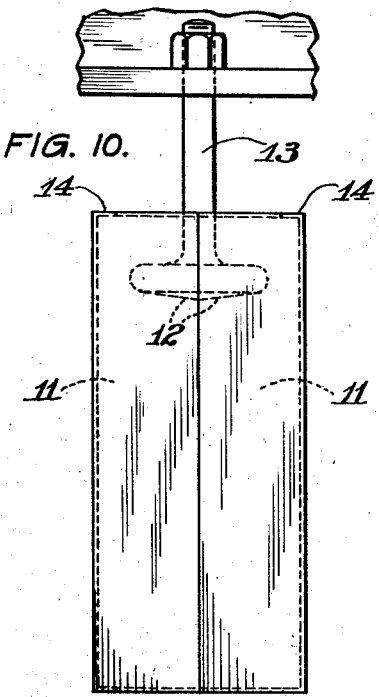
Figure 11:
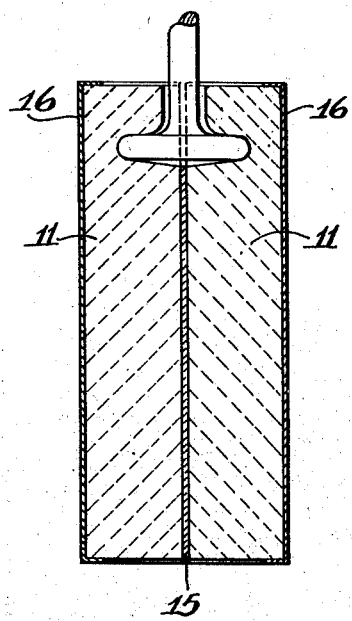

The invention is applicable also to refractory articles such as those used in the construction of suspended arch roofs. This is exemplified in Figs. 9 and 10 which illustrate one of the many types of shape for such use. The refractory shape 11 is provided with a recess 12 for receiving a hanger element 13 from which the shapes are suspended. The shape is provided with a metallic casing 14 which covers three sides of the shape so that when the shapes are associated in pairs, as illustrated in Fig. 10, which is a customary practice, there is provided a completely metal enclosed structure. The casing may be lapped over the upper end of the shape to insure its retention thereon. Another mode of accomplishing this would be to place a sheet metal member 15 between the adjoining faces of a pair of shapes 11 and then enclose the pair of shapes in a casing 16, as shown in Fig. 11. Also, if desired, the casing may extend above the shape to provide a portion from which the shape is suspended, thus dispensing with hanger elements such as shown at 13, Figs. 9 and 10.

The following examples are illustrative of the invention:

*Example 1.*—An olivine rock (dunite) containing 44 per cent of $SiO_2$, 49 per cent of $MgO$, 6 per cent of $FeO$, and 1 per cent of $Cr_2O_3$ is crushed to a maximum grain size of 30 mm. The resulting material, which is a mixture of coarsely granular, finely granular and powdery particles, is mixed with 8 per cent by weight of powdered and sintered, or dead burned, magnesite, 8 per cent by weight of powdered chrome ore, and 5 per cent by weight of caustic magnesite as a bond. The mixture is moistened with about 6 per cent by weight of lignin liquor and pressed into iron tubes of 3 mm. wall thickness, 100 mm. outside diameter and 400 mm. length, an hydraulic press being preferably used.

*Example 2.*—A dunite of the composition given in Example 1 is crushed to a grain size of about 4 mm. and the crushed material, separated from most of the finely powdered rock, is mixed with a finely divided mixture of 45 parts by weight of sintered magnesite, 50 parts by weight of chrome ore (preferably 50 to 55 per cent of $Cr_2O_3$), and 5 parts by weight of calcium borate, using, for example, equal parts by weight of such mixture and the granular dunite, or 40 parts by weight of the mixture and 60 parts of the dunite. The mixture is then moistened with about 6 per cent by weight of an aqueous molasses solution containing about 100 grams of carbohydrates per liter. After careful mixing the batch is pressed into standard brick using a pressure of from 500 to 10,000 lbs. per square inch, and the pressed brick are then associated with a metallic casing such, for example, as those shown in Figs. 1, 2 and 4. In this instance steel sheet 0.7 mm. thick gives good results.

*Example 3.*—One part of olivine rock consisting of 80 per cent of olivine mineral containing 6 per cent of $FeO$, and 20 per cent of enstatite, talc and serpentine, is mixed with 1 to 2 parts of dead burned magnesite. Suitably the olivine is crushed to a maximum grain size of about 1 to 2 mm. There is then thoroughly incorporated about 5 per cent by weight of a 10 per cent water glass solution, and the material is pressed into casings of about 1 mm. wall thickness. Such sheaths should be open on one side to permit drying, e. g., like those shown in Figs. 1, 2, 4 and 6.

*Example 4.*—A dunite of the composition given in Example 1 is cut, as by sawing, into blocks about 60 x 30 x 20 centimeters. The blocks may be polished if desired. If the rock is laminated the blocks should be cut so that the laminations run parallel to the major face. The two major faces and the two sides are encased with sheet iron of about 3 to 4 mm. thickness.

Figure 12:
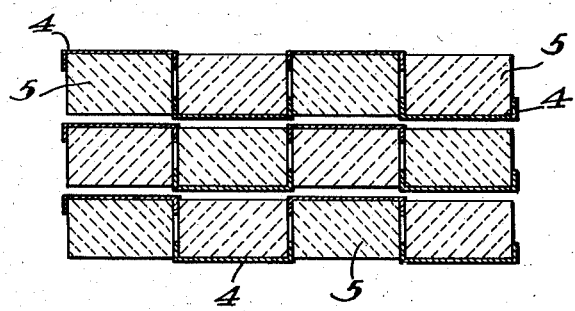

From a consideration of the embodiments shown in the drawings it will be clear that composite brick made with the cases of Figs. 1, 3 and 6 to 11 may be laid up in a furnace structure in such manner that the adjacent faces of the shapes are sheathed by metal. Substantially the same result may be achieved by appropriate laying up of composite bricks such as shown in Fig. 4, as appears from Fig. 12 in which the courses are shown separated horizontally for clarity of illustration. In such a structure the adjacent faces of the bricks are effectively completely sheathed by the metallic case.

From the foregoing description it will be understood that the terms "sheath" and "casing" as used hereinabove and in the claims apply equally to metallic members which surround the refractory body and to metallic members which cover only a portion of the body.

It will be understood also from what has been said that the invention is not restricted to the various embodiments described or shown, and that various departures are permissible without departing from the essence of the invention, which is a metal cased refractory article whose body portion is made from magnesium orthosilicate material and may consist thereof or may comprise largely such material, suitably more than 50 per cent. For instance, while reference has been made to preforming the refractory body and to packing refractory in the casing, it is possible to mix magnesium orthosilicate material with calcium aluminate cement (say 5 per cent by weight), temper the mixture with water, and cast into casings such as those shown, or into metallic forms as they are laid up in a structure.

Similarly, the invention is not restricted to the particular forms or shapes shown in the drawings, it being applicable generally to all shapes used in furnace structures, for instance arch brick, burner blocks and the like.

Again, while the invention has been described with special reference to dense refractories, it will be understood that it is applicable equally to the production of insulating refractories of more or less porous nature. Such products can be made by various procedures known in the art, as by the use of frothing agents of organic or inorganic nature, or by mixing with the batch materials which burn out or volatilize in firing of the refractory, examples being coke, cork, naphthalene, and the like. For such products the use of very thin casings, say about 0.2 to 0.5 mm. thick, is desirable. Similarly, the magnesium orthosilicate material should be finely subdivided, for instance particles of 0.1 mm. or less.

As an example, olivine rock as in Example 1 or artificially produced magnesium orthosilicate is crushed to a grain size of 0.1 mm., moistened with a chemical bonding agent, and mixed with a frothing agent. For example, the orthosilicate material is mixed with about 8 parts by weight of a 10 per cent water glass solution, and 1 per cent by weight of powdered magnesium silicide. The foamed mass is placed in containers of sheet steel closed at one end, and the filled containers are dried at about 140° C.

Nothing has been said hereinabove relative to the mode of forming the cases because they may be formed or produced according to standard procedures. Thus, cases as shown in Figs. 1 and 4 may be made by simple bending operations, while tubes may be drawn or extruded, or made by bending the sheet to shape and welding the seams.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A composite refractory article for use in furnaces, comprising a refractory body containing a substantial proportion of magnesium orthosilicate material, and a metal casing member covering at least a portion of said body member.

2. A composite refractory article for use in furnaces, comprising a refractory body containing a substantial proportion of magnesium orthosilicate material, and a ferrous metal casing member covering at least such portion of said body member that each body in a structure built from said articles is effectively surrounded by casing metal.

3. A composite refractory article for use in furnaces, comprising a refractory body containing more than about 50 per cent of magnesium orthosilicate material, and a ferrous metal casing member covering at least a portion of said body member.

4. A composite refractory article for use in furnaces, comprising a preformed refractory body formed from magnesium orthosilicate material, and a sheet metal sheath associated with said body.

5. A composite refractory article for use in furnaces, comprising a preformed refractory body formed from magnesium orthosilicate material, and a ferrous metal sheath covering at least one face of said body.

6. A composite refractory article for use in furnaces comprising a refractory body of non-circular cross section comprising predominantly olivine rock, and a ferrous metal casing covering at least three faces of said body.

7. A composite refractory article for use in furnaces comprising a refractory body formed from a mixture of non-acidic refractory material and more than about 50 per cent of magnesium orthosilicate material, and a metallic casing associated with the exterior of said body.

VICTOR MORITZ GOLDSCHMIDT.